United States Patent [19]

Fujiwara et al.

[11] Patent Number: 5,086,668
[45] Date of Patent: Feb. 11, 1992

[54] LINE PRESSURE CONTROL SYSTEM FOR AUTOMATIC TRANSMISSION

[75] Inventors: Takuji Fujiwara; Kozo Ishii; Hiroshi Yoshimura, all of Hiroshima, Japan

[73] Assignee: Mazda Motor Corporation, Hiroshima, Japan

[21] Appl. No.: 427,700

[22] Filed: Oct. 27, 1989

[30] Foreign Application Priority Data

Oct. 29, 1988 [JP] Japan .................. 63-274261

[51] Int. Cl.$^5$ .................................... B60K 41/06
[52] U.S. Cl. ................................ 74/866; 74/867
[58] Field of Search ................. 74/844, 866, 867; 364/424.1

[56] References Cited

U.S. PATENT DOCUMENTS

| | | | |
|---|---|---|---|
| 4,779,489 | 10/1988 | Haley | 74/844 |
| 4,791,568 | 12/1988 | Hiramatsu et al. | 74/867 X |
| 4,807,132 | 2/1989 | Arai et al. | 364/424.1 |
| 4,845,618 | 7/1989 | Narita | 74/866 X |
| 4,870,581 | 9/1989 | Ito et al. | 74/866 X |
| 4,898,049 | 2/1990 | Niikura | 74/866 |
| 4,919,012 | 4/1990 | Bolz | 74/866 |
| 4,922,424 | 5/1990 | Hiramatsu | 74/866 X |

FOREIGN PATENT DOCUMENTS

| | | |
|---|---|---|
| 54-2349 | 1/1979 | Japan . |
| 59-62756 | 4/1984 | Japan .................. 364/424.1 |

Primary Examiner—Leslie A. Braun
Assistant Examiner—Benjamin Levi
Attorney, Agent, or Firm—Fleit, Jacobson, Cohn, Price, Holman & Stern

[57] ABSTRACT

A hydraulic pressure control system for an automatic transmission includes a torque converter, a multiple transmission gear mechanism having a plurality of gear stages and frictional elements for switching power transmitting paths in the transmission gear mechanism, a hydraulic control mechanism for controlling engagement and disengagement of the frictional elements to establish one of the gear stages, and a line pressure control device for controlling line pressure of the hydraulic control mechanism in accordance with a vehicle operating condition. An engine torque detecting device detects an engine output torque, and a turbine speed detecting device detects a turbine speed of the torque converter. A shift condition detecting device detects a shift-up operation and a shift-down operation in the transmission, and the line pressure control device controls the line pressure in accordance with the engine torque in the shift-up operation and the turbine speed in the shift-down operation. A precise line pressure control can be accomplished for obviating torque shock at the time of the shift operation in the automatic transmission.

8 Claims, 13 Drawing Sheets

| GEAR STAGE \ TVO | 0/8 | 1/8 | 2/8 | 3/8 | 4/8 | 5/8 | 6/8 | 7/8 | 8/8 |
|---|---|---|---|---|---|---|---|---|---|
| 1→2 | PLB 1 | PLB 2 | — | — | — | — | — | — | — |
| 1→3 | — | — | — | — | — | — | — | — | — |
| 1→4 | — | — | — | — | — | — | — | — | — |
| 2→3 | — | — | — | — | PLB N | — | — | — | — |
| 2→4 | — | | | | | | | | |
| 3→4 | | | | | | | | | |

| TURBINE SP.<br>GEAR (Nt)<br>STAGE | 0 | 750 | --------- | 5250 | 6000 |
|---|---|---|---|---|---|
| 3→2 | PLB 1 | PLB 2 | --------- | PLB N | — |

LINE PRESSURE CONTROL SYSTEM FOR AUTOMATIC TRANSMISSION

BACKGROUND OF THE INVENTION

1. Field of the invention

The present invention relates to a control system for an automatic transmission of motor vehicle, and more specifically to a line pressure control for a hydraulic control mechanism of the transmission.

2. Description of the Prior Art

An automatic transmission of a motor vehicle is typically provided with a torque converter and a gear transmitting mechanism employing a planetary gear mechanism. The transmission is also provided with a plurality of frictional elements such as clutches or brakes for automatically establishing a desirable shift gear stage among the plurality of shift gear stages provided in the transmission in accordance with an engine operating condition detected by such as a vehicle speed and an acceleration stroke and the like. For this purpose, a hydraulic control circuit is provided with a plurality of solenoid valves for switching hydraulic passages in the circuit in light of a shift pattern, based on the engine operating condition obtained through a vehicle speed sensor and throttle sensor, a the like, so that the frictional elements are engaged and disengaged to perform a desirable shift operation.

Japanese Patent publication No. 54-2349, issued to Ford Motor corporation and published for opposition on Feb. 6, 1979, discloses a basic electrical hydraulic control system for an automatic transmission in which regulator valves are provided for controlling a line pressure of a hydraulic passages of circuit of the transmission, and pilot pressures of the regulator valves are controlled by solenoid valves.

Switching operation of the hydraulic passages of the hydraulic circuit must be timely done, otherwise, there might be produced a torque shock resulting from unusual change in engine and/or turbine speed.

It should be noted that there is a difference in an optimum condition for switching operation between shift-up operation and a shift-down operation of the transmission. In a shiftup operation, engine speed is dragged down because of the engaging operation of the frictional elements for establishing a proper gear stage. This means that an engine output torque greatly affects smoothness of the shift operation. It is necessary to control the switching operation in accordance with, in particular, the engine output torque. On the other hand, in a shift-down operation, the engine speed or turbine speed is more important than the engine torque in obtaining a smooth switching operation.

SUMMARY OF THE INVENTION

It is, therefore an object of the present invention to provide a line pressure control system of a hydraulic circuit for an automatic transmission which can effectively suppress a torque shock during shift operation of the transmission effectively.

It is another object of the present invention to provide a line pressure control system which can provide line pressure controls suitable for a shift-up operation and for a shift-down operation, respectively.

It is still another object of the present invention to provide a control system for controlling a line pressure of a hydraulic control system for an automatic transmission in accordance with an engine operating condition.

The above and other objects of the present invention can be accomplished by a hydraulic pressure control system for an automatic transmission comprising a torque converter, a multiple transmission gear mechanism having a plurality of gear stages and frictional elements for switching power transmitting paths in the transmission gear mechanism, a hydraulic control mechanism for controlling engagement and disengagement of the frictional elements to establish one of said gear stages, and a line pressure control device for controlling line pressure of the said hydraulic control mechanism in accordance with vehicle operating conditions. An engine torque detecting device detects an engine output torque, and a turbine speed detecting device detects a turbine speed of the torque converter. A shift condition detecting device also detects a shift-up operation and a shift-down operation in the transmission. The line pressure control device controls the line pressure in accordance with the engine torque in the shift-up operation and the turbine speed in the shift-down operation.

The above and other features of the present invention will be apparent from the following description taking reference to the accompanying drawings.

DESCRIPTION OF THE PREFERRED EMBODIMENT

Figure 1:
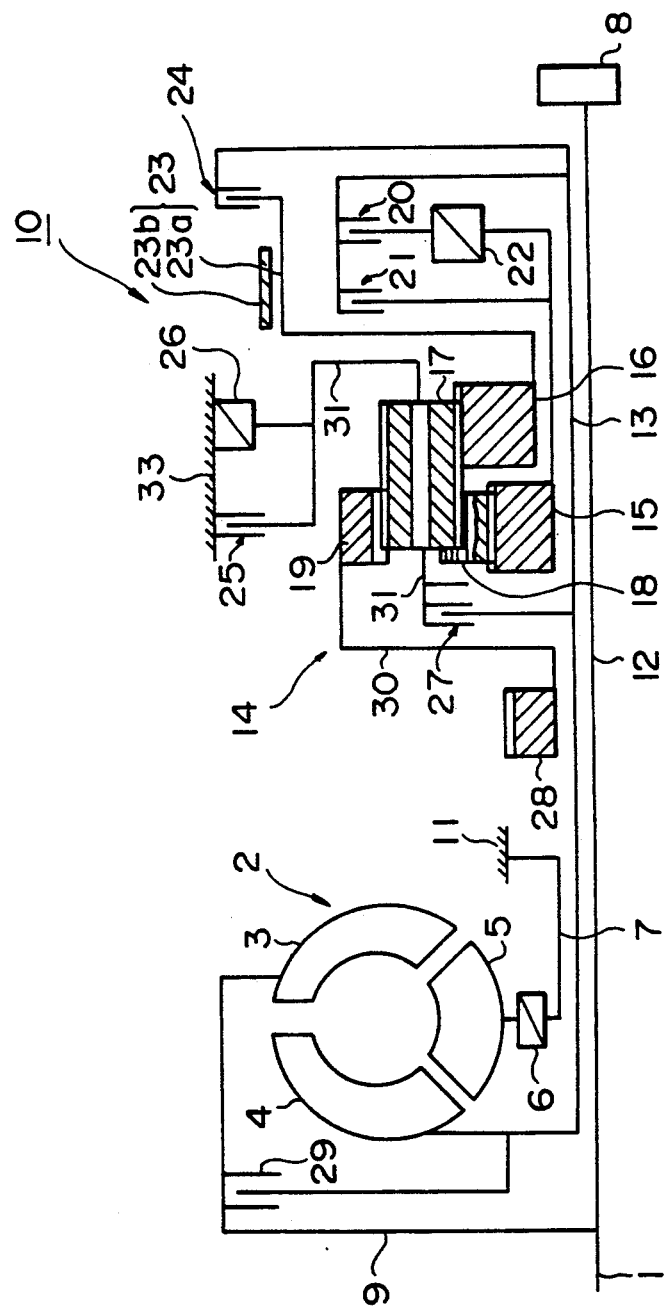
FIG. 1 is a sectional view showing an automatic transmission provided with torque converter and a hydraulic circuit to which the present invention can be applied.
Figure 2:
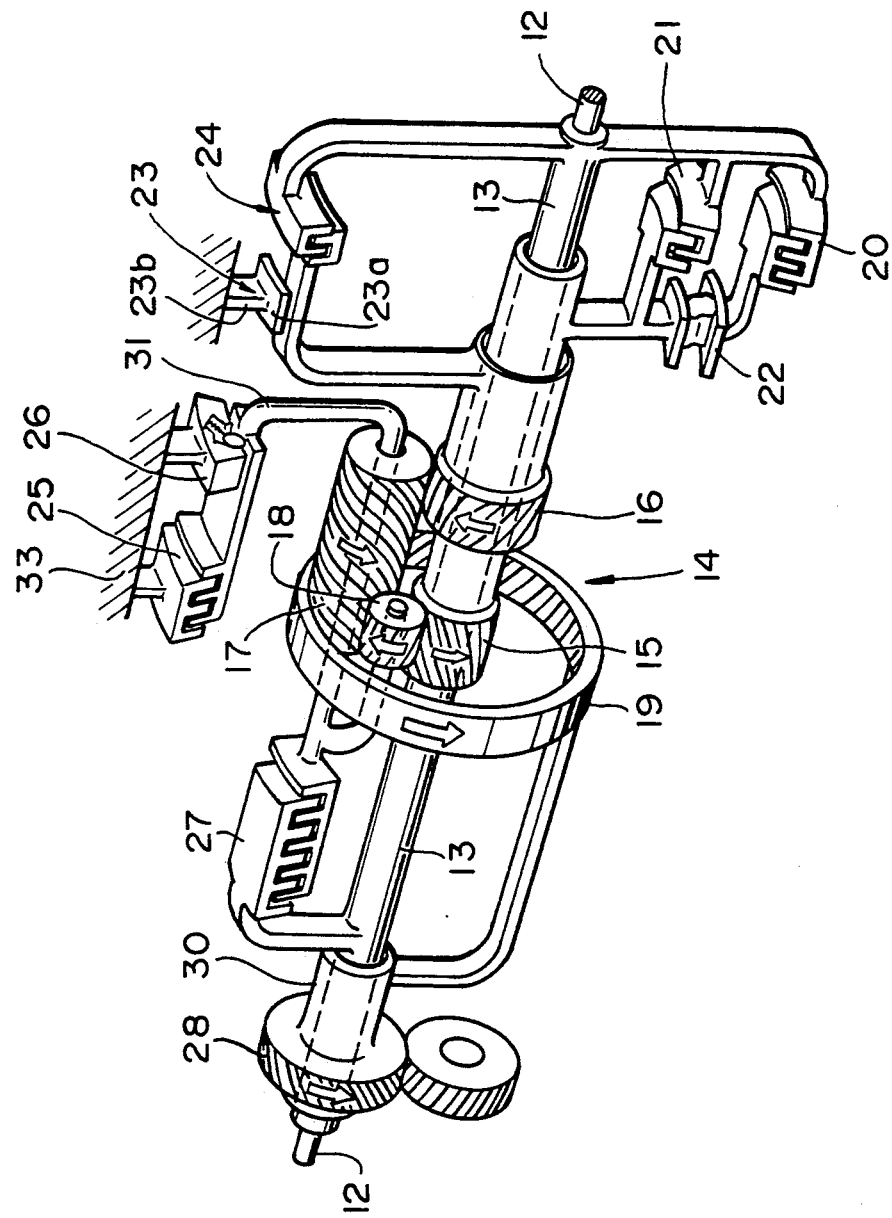
FIG. 2 is a perspective view of a multiple gear mechanism of the transmission.

Referring to FIG. 1 and FIG. 2, there is shown a structure of the automatic transmission AT in which the torque converter 2 is joined with an engine output shaft 1 and the multiple transmission gear mechanism 10 is connected with an output member of the torque converter 2.

The torque converter 2 is provided with a pump 3 connected with the engine output shaft 1, a turbine 4 and a stator 5 mounted on a shaft 7 through one-way clutch 6.

The gear mechanism 10 comprises an oil pump drive shaft 12 connected with the engine output shaft 1 at base end and with an oil pump 8 at a tip end thereof, a hollow turbine shaft 13 connected with the turbine 4 at base end outside of the oil pump drive shaft 12 and Ravigneaux-type planetary gear mechanism 14 around the turbine shaft 13. The planetary gear mechanism 14 is provided with a small sun gear 15 and a large sun gear 16 which are disposed side by side in a longitudinal direction of the transmission gear mechanism 10. The planetary gear mechanism 14 is also provided with a short pinion gear 18, a long pinon gear 17 meshed with the large sun gear 16 and the short pinion gear 18, and a ring gear 19 meshed with the long pinion gear 17.

There are provided a forward clutch 20 and a coast clutch 21 side by side as frictional elements between the turbine shaft 13 and the small sun gear 15. The small sun gear 15 is connected with the turbine shaft 13 through the forward clutch 20, located rearward of the large sun gear 16, and a first one-way clutch 22 connected with the forward clutch 22 for preventing a reverse rotation of the turbine shaft 13. The coast clutch 21 is also arranged between the turbine shaft 4 and the small sun gear 15 in a row with the forward clutch 20 and the one-way clutch 16.

Outside of the coast clutch 21, there is disposed a 2-4 brake 23 provided with a brake drum 23a connected with the large sun gear 16 and a brake band 23b adapted to be engaged with the brake drum 23a so that when the 2-4 brake is engaged, the large sun gear is fixed. A reverse clutch 24 is arranged rearward of the brake 23 for controlling a power transmission between the large sun gear 16 and the turbine shaft 13 through the brake drum 23a to thereby establish a reverse shift stage.

There is provided a low & reverse brake 25 between a carrier 14a of the planetary gear mechanism 14 and a casing 10a of the transmission gear mechanism 10 for controlling the engagement and disengagement between the carrier 14a and the casing 10a. The long pinion 17 is connected with the low & reverse brake 25 for fixing the long pinion 17 and with a second one-way clutch 26 arranged in a row with the brake 25 for allowing a rotation of the long pinion 17 in the same direction as the engine output shaft 1.

A 3-4 clutch 27 is arranged in front of the planetary gear mechanism 14 for controlling the engagement and disengagement of the carrier 14a and the turbine shaft 13. An output gear 28 disposed in front of the 3-4 clutch 27 is connected with the ring gear 19 through an output shaft 28a. Numeral 29 denotes a lock-up clutch for directly connecting the engine output shaft 1 with the turbine shaft 13.

The multiple transmission gear mechanism 10 as illustrated is provided with four shift gear stages for forward movement and one shift gear stage for reverse movement. The clutches 20, 21, 24 and 27 and brakes 23 and 25 are controlled to establish a desirable shift gear stage among the plurality of the shift gear stages.

The table 1 shows operations of the respective clutches and brakes in the respective shift gear stages of the transmission.

TABLE 1

| REFERENCE | CLUTCH 24 | CLUTCH 20 | CLUTCH 21 | CLUTCH 27 | BRAKE 25 | BRAKE 23 | ONE-WAY CLUTCH 26 | ONE-WAY CLUTCH 22 |
|---|---|---|---|---|---|---|---|---|
| P |  |  |  |  |  |  |  |  |
| R | O |  |  |  | O |  |  |  |
| N |  |  |  |  |  |  |  |  |
| D RANGE |  |  |  |  |  |  |  |  |
| 1 |  | O |  |  |  |  | (O) | (O) |
| 2 |  | O |  |  |  | O |  | (O) |
| 3 |  | O | O | O |  |  |  | (O) |
| 4 |  |  | O | O |  | O |  |  |
| 2 RANGE |  |  |  |  |  |  |  |  |
| 1 |  | O |  |  |  |  | (O) | (O) |
| 2 |  | O | O |  |  | O |  | (O) |
| 3 |  | O | O | O |  |  |  | (O) |
| 1 RANGE |  |  |  |  |  |  |  |  |
| 1 |  | O | O |  | O |  |  | (O) |
| 2 |  | O | O |  |  | O |  | (O) |

In the table 1, reference character 0 means that the corresponding element is under operation for transmitting a torque, but the corresponding element to reference character 0 is effected to transmit the power only when it functions as a driving element.

Hereinafter, a hydraulic circuit HU for controlling the above friction elements to establish a desirable gear stage in accordance with vehicle operating condition will be explained in connection with operations of the above frictional elements, taking reference to FIG. 3.

Figure 3:
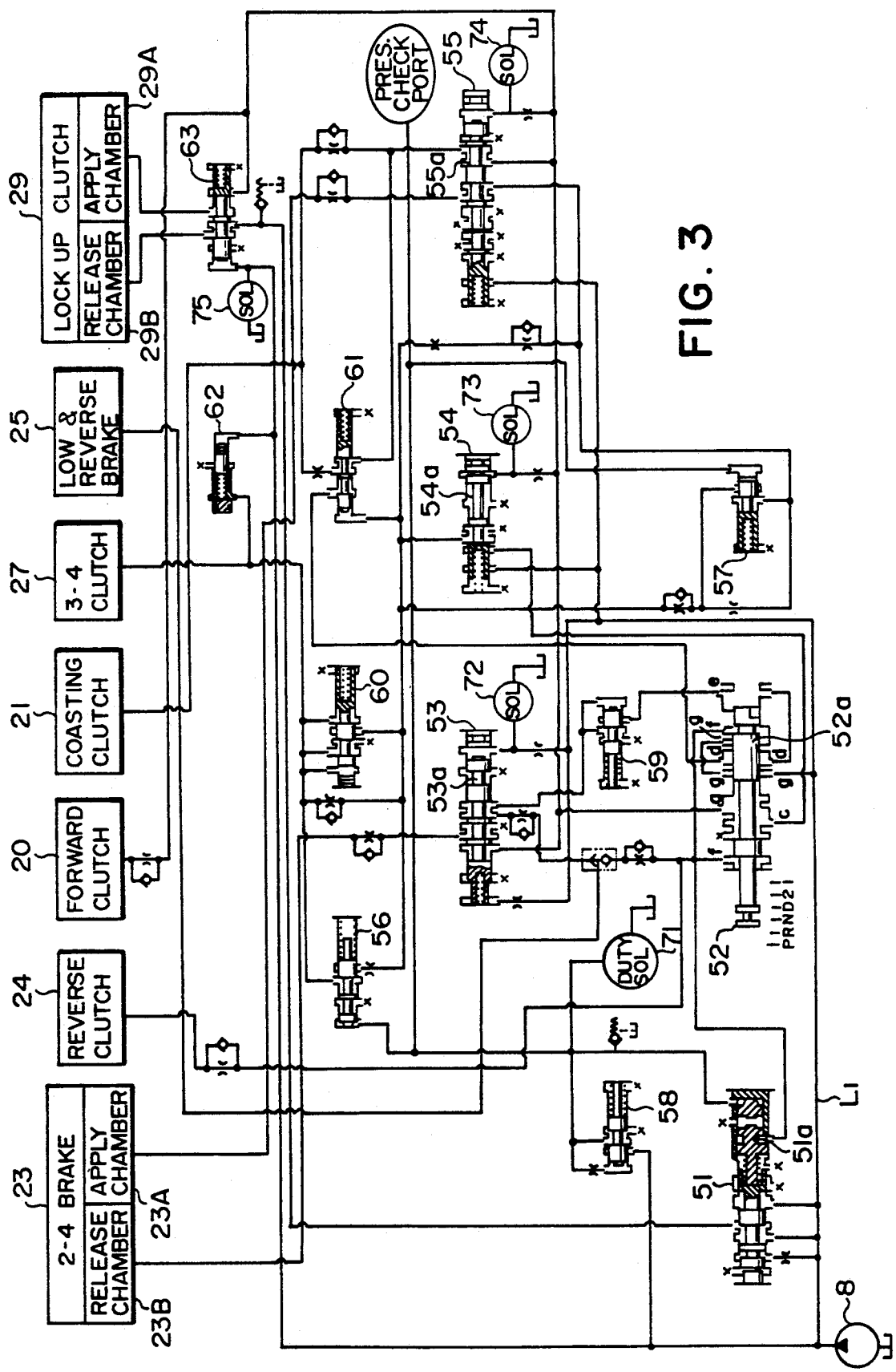
FIG. 3 a hydraulic control circuit in accordance with a preferred embodiment of the present invention.

As shown in FIG. 3, the oil pump 8 discharges a hydraulic fluid to the hydraulic passage L1. The hydraulic pressure of the fluid is introduced into the pressure regulating valve 51. The pressure regulating valve 51 is controlled by the duty solenoid valve 71 to adjust the line pressure of the hydraulic control circuit HU. In detail, the hydraulic pressure from the pump 8 is reduced in a reducing valve 58 to a predetermined value. Thereafter, the hydraulic pressure is adjusted, by virtue of a duty control of the solenoid valve 71 by controlling an amount of drain, and introduced into the pressure regulating valve 51 as a pilot pressure therefor. Thus, the line pressure control of the hydraulic control circuit HU is established. The regulated line pressure is introduced into a port g of a manual shift valve 52. The manual shift valve 52 is provided with a spool 52a connected with a select lever and associated with the lever so that the spool 52a can be moved in accordance with a manual operation of the select lever by a driver to the range D, in which the gear shift operation is automatically made among the four forward gear stages, a range 2, in which the gear shift operation is automatically made among the first through a third gear stages of a transmission, the range 1, in which the gear shift operation is automatically made between the first and second gear stages, a reverse range R, a parking range P, and a neutral range N.

The port g is communicated with ports a, d and e when set at the range 1, with ports a, c and d when set in the range 2, with ports a and c when in the range D, and with a port f when set at the reverse range R.

The port a of the manual shift valve 52 is connected with a 1-2 shift valve 53. A spool 53 of the 1-2 shift valve 53 urged by a spring is subjected to a pilot pressure which is adapted to be controlled by a 1-2 solenoid valve 72. When the shift stage is the first stage, the 1-2 solenoid valve 72 is turned off so that the spool 53a thereof is moved toward the left end to connect an apply chamber 23A of the 2-4 brake 23 to a draining port. When the shift stage is the second to fourth stages, the 1-2 solenoid valve 72 is turned on so that the spool 53a is moved toward the right end in the drawing. As a result, the hydraulic pressure is introduced from the port a into the apply chamber 23A of the 2-4 brake 23 through the 3-4 shift valve 55. When the shift stage is the first stage in the range 1, the 1-2 shift valve 53 introduces the hydraulic pressure supplied from the port e of the manual shift valve 52 through a low reducing valve 59 into the low & reverse brake 25.

The hydraulic pressure from the port a of the manual shift valve 52 is applied to a 2-3 shift valve 54 as a pilot pressure as well. The 2-3 shift valve 54 is connected with the port c of the manual valve 52. The pilot pressure therefor is controlled by a 2-3 solenoid valve 73. When in the first and second stages, the 2-3 solenoid valve 73 is turned on, causing a spool 54a of the valve 73 to be moved rightward so that the 3-4 clutch 27 is connected with a draining passage to release the 3-4 clutch 27.

When in the third and fourth stages, the 2-3 solenoid valve 73 is turned off, causing the spool 54a to be moved leftward so that the hydraulic pressure from the port c is introduced into the 3-4 clutch 27 through a 2-3 timing valve 56 to establish an engaged condition thereof. In this case, the hydraulic pressure is introduced into a release chamber 23B of the 2-4 brake 23 to release it. There is provided an accumulator 62 for easing a shock at the time of engaging action of the 3-4 clutch 27.

The hydraulic pressure from the port a of the manual shift valve 52 is introduced into a 3-4 shift valve 55 as a pilot pressure controlled by a 3-4 solenoid valve 74. When the shift stage is the first, second and fourth stages in the range D, and the first stage in the range 2, the 3-4 solenoid valve 74 is turned on, causing a spool 55a of the valve 55 to be moved rightward so that the release chamber 23B of the 2-4 brake 23 is connected with a draining passage.

When the shift stage is the third stage in the range D, the second and third stages in the range 2 and the first and second stages in the range 1, the 3-4 solenoid valve 74 is turned off, causing the spool 55a to be moved leftward so that the hydraulic pressure from the 1-2 shift valve 53 is introduced into the apply chamber 23A of the 2-4 brake 23 and the hydraulic pressure bypassing the 1-2 shift valve 53 from the port a of the manual shift valve 52 is introduced into the coasting clutch 21 through the 3-4 shift valve 55 and a coasting bypass valve 61. As a result, the introduction of the hydraulic pressure is controlled in accordance with the operation of the 2-3 shift valve 54.

The low reducing valve 59 introduces the hydraulic pressure from the port e of the manual shift valve 52 into the 1-2 shift valve 53 after reducing the pressure by itself, in the range 1. In the first stage of the range 1, the low reducing valve 59 introduces the hydraulic pressure from the 1-2 shift valve 53 into the low & reverse brake 25. The 2-3 timing valve is provided for easing the torque shock at the time of a switching operation from the second stage to the third stage.

In order to obviate the torque shock in the switching operation from the third stage to the second stage, there are provided a 3-2 timing valve 57 and a bypass valve 60.

The lock-up clutch 29 is connected with the lock-up control valve 63, subjected to the hydraulic pressure against a resilient force of spring and a driving force of the forward clutch 20. When the lock-up solenoid valve is turned on, the hydraulic pressure is introduced into an apply chamber 29A while the hydraulic pressure in a release chamber 29B is drained to engage the lock-up clutch 29

Figure 4:
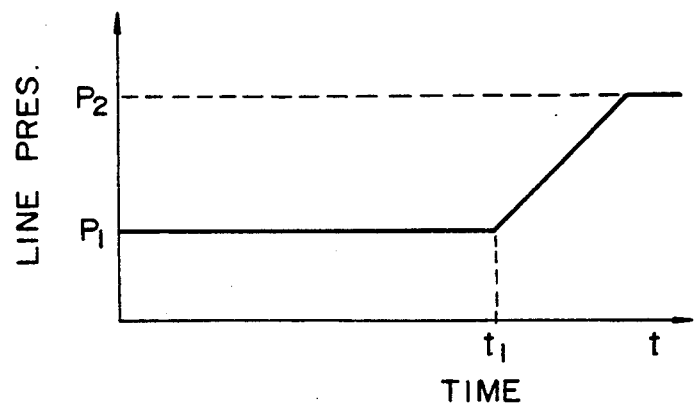
FIG. 4 a graphical representation showing a time chart of a line pressure in a shift operation.
Figure 5:
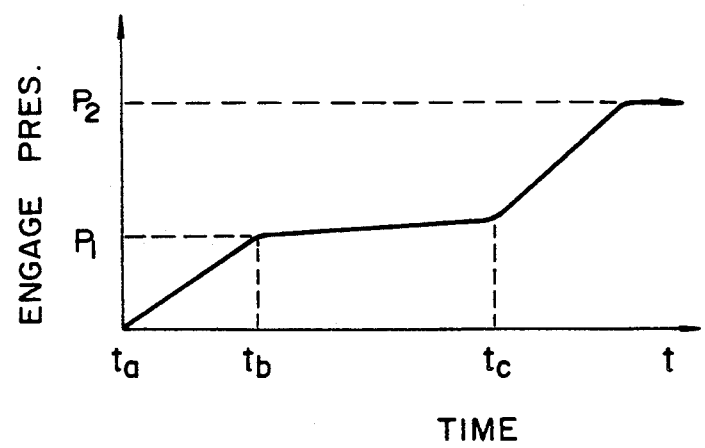
FIG. 5 is a graphical representation showing a time chart of an engaging pressure of a friction element.

In the case where the range is changed from N(neutral) to R(reverse), the hydraulic pressure from the port f of the manual shift valve 52 is introduced into both the reverse clutch 24 and the low & reverse clutch 25 after being regulated by the duty solenoid valve 71. The reverse clutch 24 and the low & reverse clutch 25 are engaged to establish the reverse stage. In order to obviate the torque shock in the switching operation from the range N to the range R, the low & reverse brake 25 is engaged to fix the carrier 31 of the planetary gear unit 14. Thereafter, the reverse clutch 24 is engaged. In this case, the reverse clutch 24 and the low & reverse brake 25 are subjected to a relatively low hydraulic pressure to be engaged. For this purpose, when the change from the range N to the range R is detected, based on the shift position of the manual shift valve 52, the line pressure P is set at a relatively low value Pl for a predetermined time period tl( which is needed to complete the engagement of the reverse clutch 24 and the low & reverse brake 25) wherein the line pressure P is normally set at the value P2, which is higher than the value P1, as shown FIG. 4. The reverse clutch 24 and the low & reverse brake 25 are concurrently engaged by virtue of the pressure P1. The hydraulic pressure introduced into the reverse clutch 24 and the low & reverse brake 25 is increased during a time ta (shift operation) to a time tb, is maintained at a substantially constant value P1 during the time tb to a time tc, and is increased again after a time tc toward the pressure P2, as shown in FIG. 5. Since the engaging action is completed during the time tb to tc, the torque shock through the switching operation can be obviated. The reverse clutch 24 is different from the low & reverse brake 25 in friction coefficient. Thus, although the same pressure is applied to both clutch 24 and brake 25 the low & reverse brake 25, having a greater friction coefficient, is engaged, and then the reverse clutch 24, having a relatively small friction coefficient is engaged.

Figure 6:
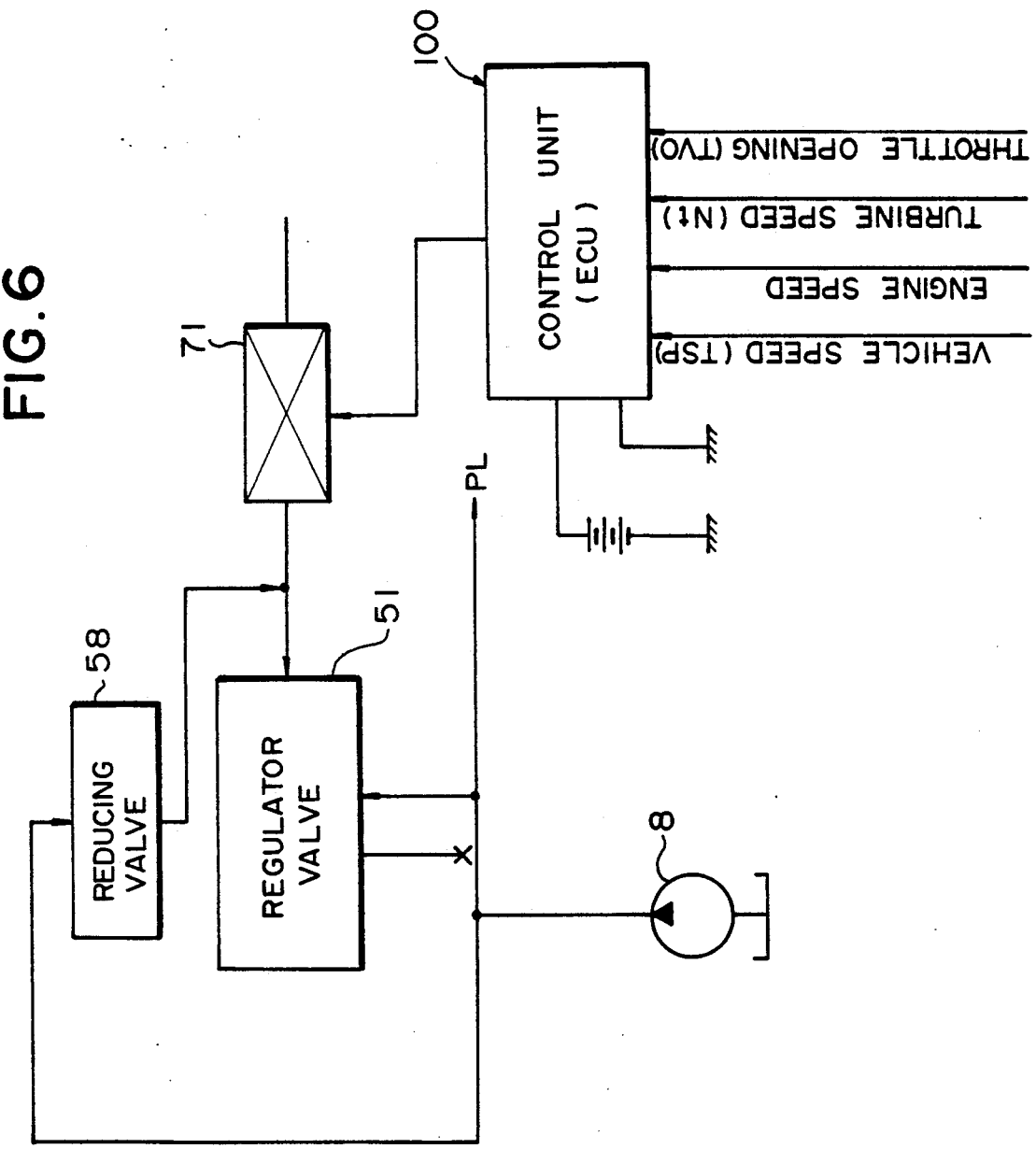
FIG. 6 is a block chart of a control system applied in the present invention.

Referring to FIG. 6, there is provided an electronic control unit (ECU) 100 constituted by a microcomputer the like, for controlling the hydraulic control circuit HU. The control unit 100 receives signals denoting engine speed, vehicle speed, turbine speed (N+), throttle opening (TVO), and other signals for denoting vehicle operating conditions including an engine operating condition. The control unit 100 processes such input signals to obtain an engine torque or engine load, a throttle valve opening change, a torque ratio, speed ratio a in the transmission, and other parameters necessary for carrying out the shift control. The engine torque can be obtained from the throttle opening and engine speed. An intake gas amount can be employed for obtaining the engine torque. Any other conventional technique for obtaining the engine torque can be employed. The control unit 100 provides various solenoid valves, including the duty solenoid valve 71, with control signals for carrying out the control of the line pressure of the control circuit HU.

Figure 7:
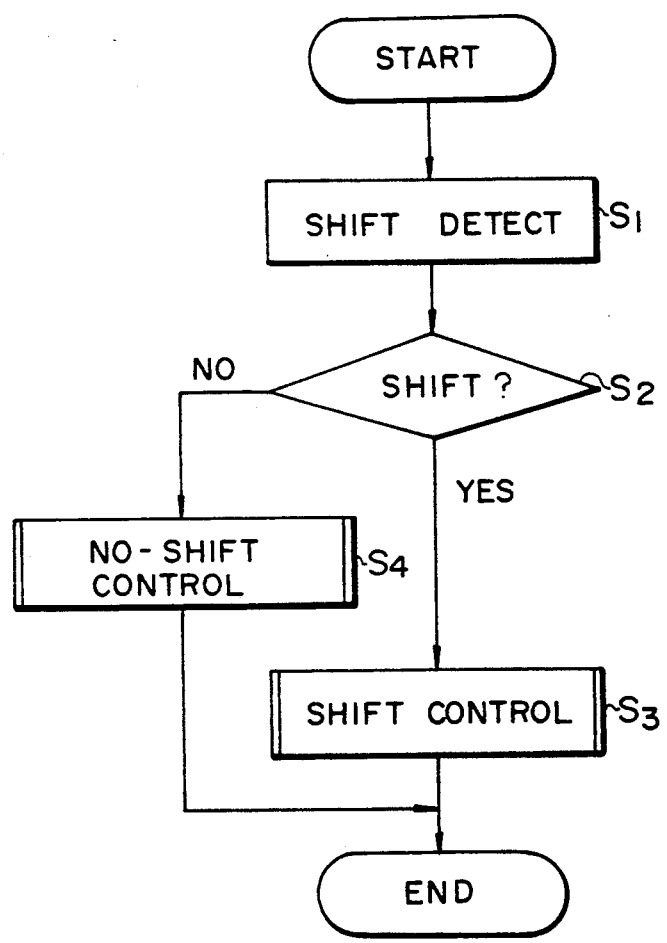
FIG. 7 is a flow chart of a main routine of a line pressure control.

Referring to FIG. 7, there is shown a main routine of the control for the hydraulic circuit HU.

According to the illustrated embodiment, the a different line pressure control is provided for the shift-up operation and for the shift-down operation.

Figure 9:
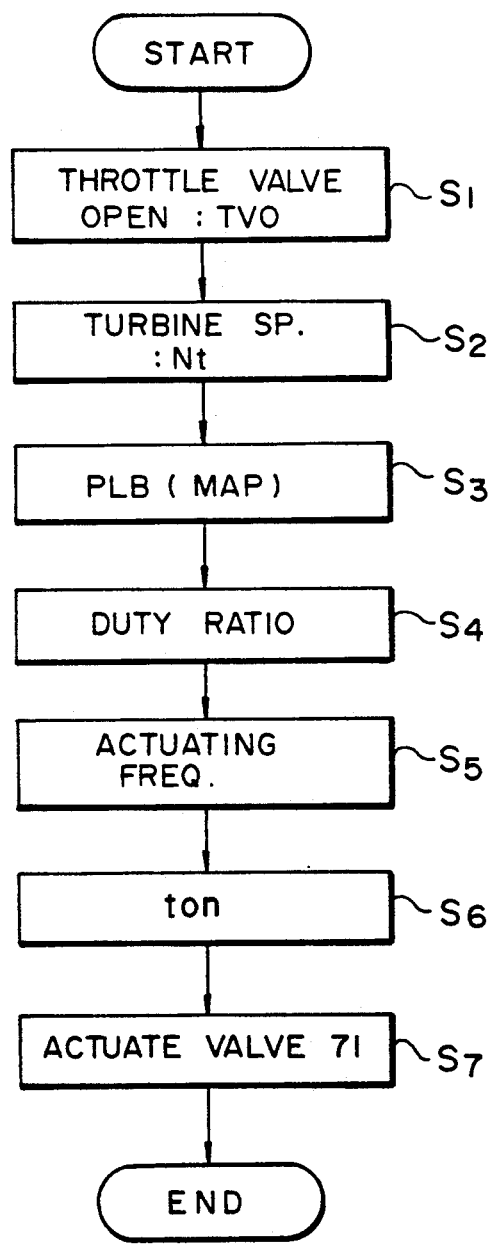
FIG. 9 is a flow chart of a routine of a line pressure control under a no-shift operation.

The control unit 100 reads signals from sensors for detecting a shift operation, such as an inhibitor switch (Sl). The control unit 100 judges as to whether or not the transmission AT is in a shift operation, in light of the shift pattern, in step S2. If the judgment is No, or the transmission AT is not in the shift operation, the control unit 100 carries out, in step S4 a line pressure control in accordance with a routine provided for no-shift operation as shown in FIG. 9. If the judgment is Yes in step S2, the control unit 100 carries out a routine for the shift operation shown in FIG. 10.

The control unit 100 is provided with a routine for determining the duty ratio for the solenoid valves.

Figure 8:
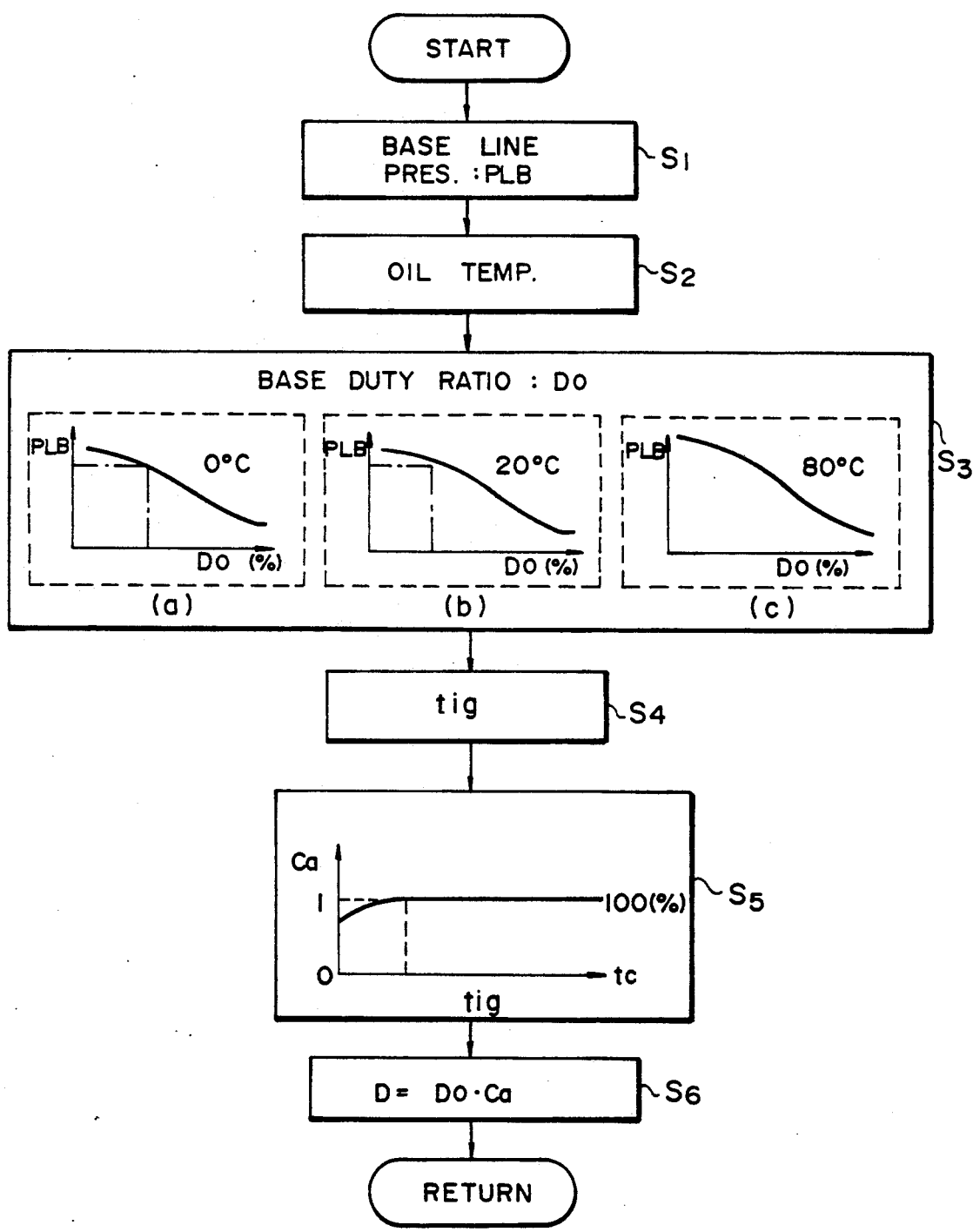
FIG. 8 is a flow chart of a routine for determining a duty ratio for a solenoid valve.

Referring to FIG. 8, there is shown a procedure for determining the duty ratio D.

The control unit 100 reads the base line pressure PLB in step Sl and reads a temperature of the hydraulic fluid in the transmission AT in step S2. In step S3, the control unit 100 determines a base duty ratio D0 in accordance with the hydraulic fluid temperature. The control unit 100 is provided with maps providing the base duty ratio D0 based on the line pressure. Several maps are prepared with regard to respective temperatures of the hydraulic fluid, since the relationship between the line pressure and the base duty ratio D0 is changed in accordance with the temperature of the hydraulic temperature for better control. An accurate value of the base duty ratio D0 can be obtained by means of a linear interpolation utilizing two maps even when the temperature of the hydraulic fluid is at an intermediate value.

It is preferable to take into account the effect of air and the like in the hydraulic fluid at the initial stage of the operation of the transmission. For this purpose, in step S4, a time period tig is detected after starting engine. According to the illustrated control, a compensation coefficient Ca is obtained through a map in accordance with the time period tig after starting engine, in step S5. In step S6, the control unit 100 calculates the duty ratio D by multiplying the coefficient Ca into the base duty ratio D0.

FIG. 9 shows a pressure control in the non-shift operation in step S4 of FIG. 7.

The control unit 100 reads the throttle opening TVO (S1) and the turbine speed Nt (S2).

Figure 11:
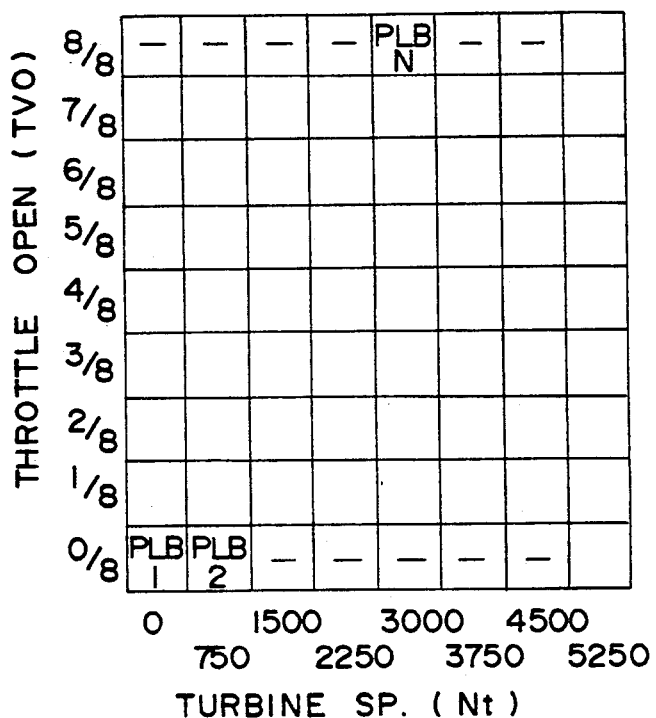
FIG. 11 shows a map providing a relationship between the line pressure, throttle opening and the gear stages involved in the shift operation.

In step S3, the control unit 100 obtains the base line pressure PLB of the control circuit HU in light of a map stored in a memory of the unit 100 in accordance with the throttle opening TVO and the turbine speed Nt as shown in FIG. 11. In step S4, the control unit 100 determines a duty ratio D for the duty solenoid valve 71 in accordance with the base line pressure PLB obtained in step S3. The control unit 100 sets a frequency for actuating the solenoid valve 71, for instance 35 Hz in the illustrated embodiment in step S5. In step S6, the control unit 100 determines on-period ton in a single cycle by multiplying the duty ratio D into an operating cycle.

Figure 12:
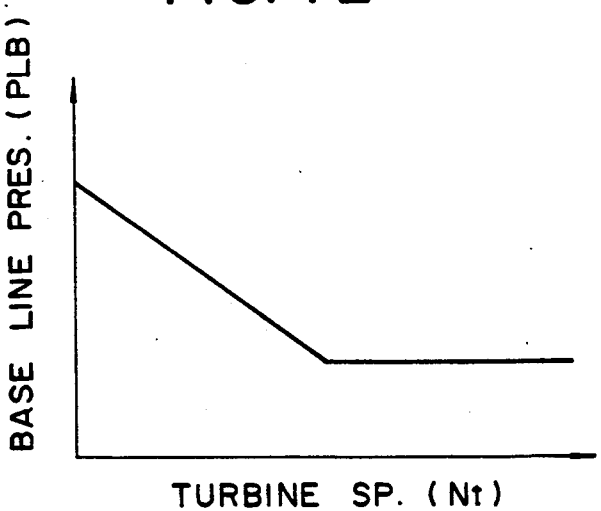
FIG. 12 is a graph showing a relationship between the base line pressure and the turbine speed.
Figures 13, 14:
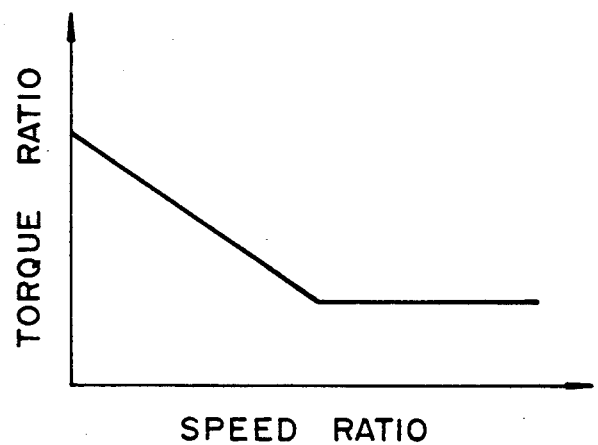
FIG. 13 is a graphical representation showing a relationship between a torque ratio and a speed ratio.
FIG. 14 shows a map providing a relationship between the line pressure, throttle opening and the gear stages involved in the shift operation.

In step S7, the control unit 100 actuates the solenoid valve 71 in accordance with the result of step S6 so as to accomplish the line pressure obtained in step S3 by applying a duty signal of normal frequency 35 Hz. In FIG. 12, there is shown a relationship between the base line pressure PLB and the turbine speed Nt obtained through the map shown in FIG. 11. FIG. 13 shows a relationship between a torque ratio and a speed ratio in the transmission AT.

Figure 10:
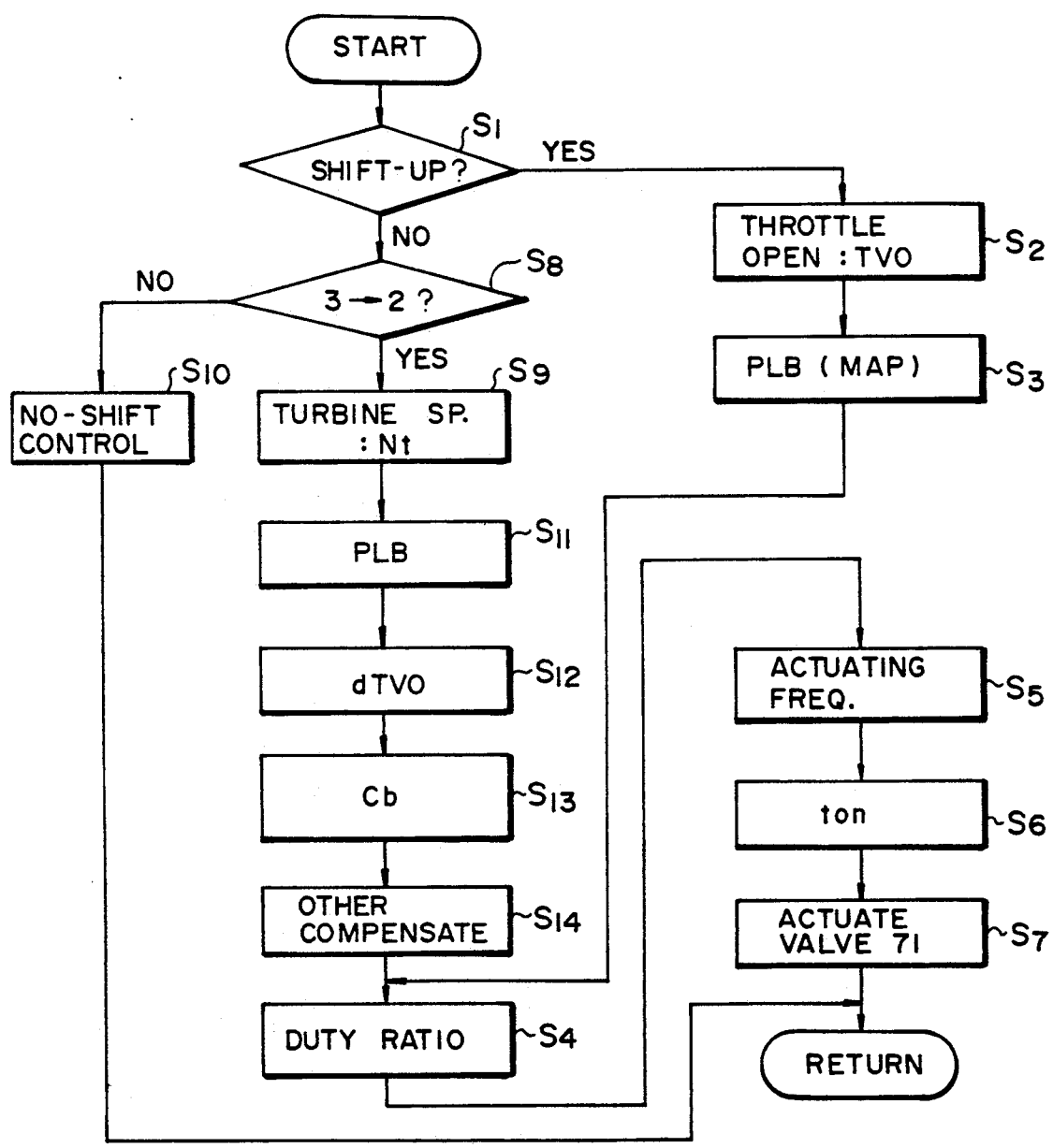
FIG. 10 is a flow chart of a routine of a line pressure control during a operation.

The line pressure control during the shift operation of step S3 in FIG. 7 is carried out in accordance with a routine shown in FIG. 10.

At first, the control unit 100 judges whether or not the shift operation is a shift-up operation in step Sl. In shift-up operation, the control unit 100 reads the throttle opening TVO in step S2 and determines the base line pressure PLB in light of a map as shown in FIG. 14 in accordance with the throttle opening TVO and gear stages involved in the shift-up operation. Next, the control unit 100 determine the duty ratio in step S4 and carries out step S5 to S7 to actuate the solenoid valve 71 which is the same procedure as step 5–7 in FIG. 9.

Figures 15, 16:
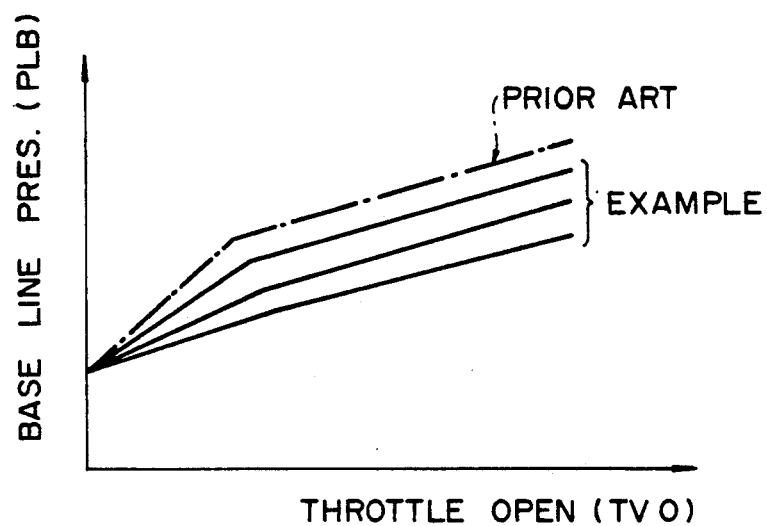
FIG. 15 is a graphical representation showing a relationship between the throttle opening and the base line pressure obtained in accordance with the gear stages.
FIG. 16 a map providing a relationship between the base line pressure and turbine speed in the case of shift-down operation from third stage to second stage.

As shown in FIG. 15, the line pressures obtained through the above procedure are lower than the value under a conventional control, shown by a chain line. Thus, precise control of the line pressure can be accomplished in accordance with the gear stages involved by the present invention.

If the judgment of the step S1 is No, or the transmission AT is in a shift-down operation in FIG. 10, the control unit 100 further judges whether or not the shift-down operation is a shift from the third to second stages in step S8.

In the shift-down operation of the third to second stages, the control unit 100 determines the base line pressure PLB in light of a map as shown in FIG. 16 in accordance with the turbine speed Nt in steps 9 and 11. It should be noted that a timing control through the line pressure control is needed in the case where the shift-down operation is made from the third to second stages because engaging action of the frictional elements such as the 3-4 clutch and the 2-4 brake 23 is necessary. When only the disengagement actions of the friction elements occurs in a shift operation, there is no need of the timing control for the switching operation of the friction elements involved.

If the judgment in step S8 is No, the control unit 100 carries out the procedure in FIG. 9.

Figure 17:
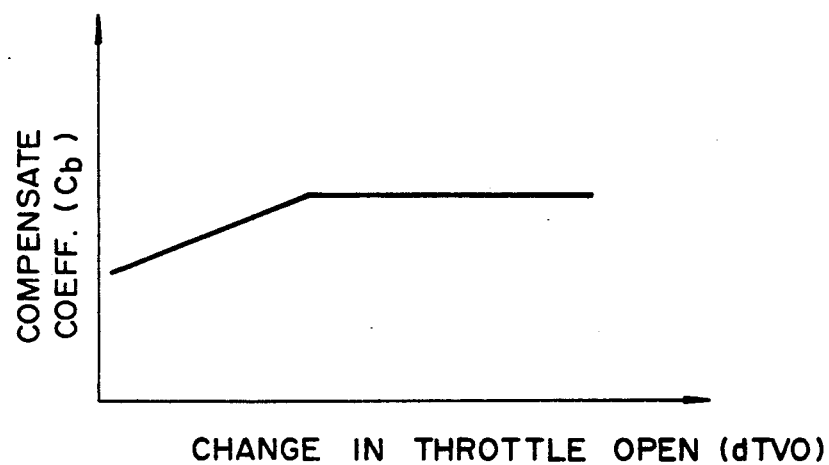
FIG. 17 is a graphical representation showing a relationship between a throttle opening change and a coefficient for compensating the line pressure.

In step S12, the control unit 100 calculates a throttle opening change dTVO. The control unit 100 compensates the base line pressure PLB in accordance with the change dTVO in the throttle opening TVO by employing and multiplying a compensation coefficient Cb into the base line pressure PLB in steps S13. The coefficient Cb is provided in accordance with the change dTVO in the throttle opening as shown in FIG. 17.

Next, the control unit 100 modifies the base line pressure PLB based on, e.g. a learning control of time period in step S14 of the switching operation in step. Thereafter the control unit 100 determines the duty ratio D of the solenoid valve 71 in step S4, sets the actuating frequency for actuating the valve 71 in step S5, calculates on-period of the solenoid in step S6 and actuates the valve 71 in step S7.

This procedure is carried out for modifying the value of the line pressure obtained through step S4 of FIG. 7 and stored in the memory of the control unit 100 in accordance with the shift operation time period.

When the throttle opening change dTVO takes a large value, an increase of the engine speed or turbine speed is abrupt. Under this condition, according to the present invention, the compensating coefficient Cb is increased to increase the line pressure so that the friction elements involved in the shift operation can be quickly engaged to reduce the torque shock.

Figure 18:
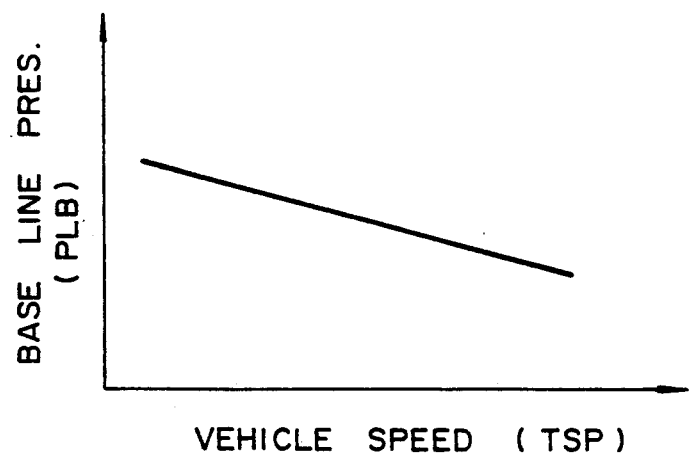
FIG. 18 a graphical representation showing a relationship between a vehicle speed and the base line pressure.

As shown in FIG. 18, as the vehicle speed TSP is increased, the increase in the turbine speed at the time of the shift-down operation is abrupt. In this case, the line pressure is reduced to make the engaging action of the friction elements slow for preventing an abrupt change in the turbine speed.

It will be apparent that various modifications and improvements may be made based on the above description by those skilled in the art without departing from the spirits of the present invention, and protection for all of these which fall within the scope of the claims as attached is intended.

We claim:

1. A hydraulic pressure control system for an automatic transmission comprising:
   a torque converter,
   a transmission gear mechanism having a plurality of gear stages and frictional elements for switching power transmitting paths in the transmission gear mechanism,
   a hydraulic control mechanism for controlling engagement and disengagement of the frictional elements to establish one of said gear stages,
   line pressure control means for controlling line pressure of said hydraulic control mechanism in accordance with vehicle operating condition,
   an engine torque detecting device for detecting an engine output torque,
   turbine speed detecting means for detecting a turbine speed of the torque converter,
   shift condition detecting means for detecting a shift-up operation and a shift-down operation in the transmission, said line pressure control means controlling the line pressure in accordance with the engine torque after the shift condition detecting means detects a shift-up operation and with the turbine speed after the shift condition detecting means detects a shift-down operation.

2. A hydraulic pressure control system as recited in claim 1, and further comprising base line pressure determining means for determining a base line pressure for the hydraulic control mechanism in accordance with gear stages involved in the shift-up operation and the engine output torque in the shift-up operation.

3. A hydraulic pressure control system as recited in claim 1 wherein said engine torque detecting device has throttle opening detecting means for detecting a throttle valve opening.

4. A hydraulic pressure control system as recited in claim 1 wherein said line pressure is increased as the engine output torque is increased.

5. A hydraulic pressure control system as recited in claim 1, and further comprising base line pressure determining means for determining a base line pressure for the hydraulic control mechanism in accordance with gear stages involved in the shift-down operation and the turbine speed in the shift-down operation.

6. A hydraulic pressure control system as recited in claim 5 wherein said engine torque detecting device has throttle opening detecting means for detecting a throttle valve opening, said line pressure being compensated in accordance with a change in the throttle valve opening.

7. A hydraulic pressure control system as recited in claim 5 wherein the line pressure is compensated to be increased as the change in the throttle valve opening is increased.

8. A hydraulic pressure control system as recited in claim 5 wherein the base line pressure is decreased as a vehicle speed is increased.

* * * * *